L. A. WILLIAMS.
SHOCKING MACHINE.
APPLICATION FILED FEB. 4, 1914.

1,126,604.

Patented Jan. 26, 1915.

Lloyd A. Williams
Inventor,

Witnesses by C. A. Snow & Co.
Attorneys.

L. A. WILLIAMS.
SHOCKING MACHINE.
APPLICATION FILED FEB. 4, 1914.

1,126,604.

Patented Jan. 26, 1915.
5 SHEETS—SHEET 2.

Fig. 2.

Lloyd A. Williams
Inventor,
by C. A. Snow & Co.
Attorneys.

Witnesses

UNITED STATES PATENT OFFICE.

LLOYD A. WILLIAMS, OF BURLINGTON, KANSAS.

SHOCKING-MACHINE.

1,126,604.  Specification of Letters Patent.  Patented Jan. 26, 1915.

Application filed February 4, 1914. Serial No. 816,571.

*To all whom it may concern:*

Be it known that I, LLOYD A. WILLIAMS, a citizen of the United States, residing at Burlington, in the county of Coffey and State of Kansas, have invented a new and useful Shocking-Machine, of which the following is a specification.

This invention relates to machines for forming shocks, one of its objects being to receive the bundles as they are discharged from a harvester and to fasten the bundles together automatically so as to produce a large bundle or shock the parts of which are held against displacement relative to each other.

Another object is to provide novel means whereby the bundles, as they are delivered to the shocking mechanism, are fastened together, portions of each bundle being used as a tying or fastening means.

Another object is to provide improved means whereby, when the shock reaches predetermined proportions, it will be deposited automatically on the ground with its butt end downward.

A further object is to provide means whereby, while the shock is being deposited on the ground, bundles may be accumulated within the shock former until after the parts have been reset subsequent to depositing the shock.

Another object is to provide a shocking machine which is designed to be connected to and to move with any ordinary form of harvester, means being utilized for elevating the bundles from the harvester to the shock former as fast as they are discharged from the harvester.

A further object is to provide improved means whereby the shock, after being formed in a substantially horizontal position, is tilted to an upstanding position so as to be left standing upon the ground.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings.

Referring to the figures by characters of reference 1 designates the base frame of the shock former, the same being made, preferably, of angle strips and being open at its back end. A bracket 2 is extended forwardly from the base frame at the inner side thereof and is supported by a caster 3.

Standards 4 are extended upwardly from the inner side of the base frame 1, these standards being preferably formed of angle strips and constituting guide rails for the purpose hereinafter set forth. These standards 4 are connected by upper and lower cross strips 5 and 6 respectively and brackets 7 are extended laterally from the strip 6 and constitute bearings for the upper shaft 8 of an endless elevator 9. This elevator can be made up of chains mounted on sprockets 10 secured to the shaft 8, the said chains being provided with outstanding fingers 11 and being also mounted on sprockets 12 secured to a shaft 13 which is journaled within the lower portion of an extension frame 14 supported beyond one side of the base frame 1 and connected to said base frame by means of a brace 15 of any suitable construction.

A main drive wheel 16 is mounted for rotation between the base frame 1 and the brace 15 and the hub of this wheel is provided, at one side, with a ratchet wheel 17.

A sprocket wheel 18 is mounted for rotation close to the ratchet wheel 17 but independently thereof and secured to one side of the hub of the sprocket wheel 18 is a lever 19 carrying a laterally extending pin 20. This pin is adapted to be seated in a notch 21 in the periphery of the hub of sprocket wheel 18 and also to project into engagement with one of the teeth of the ratchet wheel 17.

A spring 22 is mounted on the hub of sprocket wheel 18 and bears against the angular end 23 of lever 19 so as to hold said lever in either of two positions. When the lever is in one of these positions, the finger 20 is seated in notch 21 and in engagement with one of the teeth of ratchet wheel 17 whereas, when the lever is in its other position, the said finger is out of engagement with the ratchet wheel 17 and also with the notch 21. Consequently the said lever and its finger or pin 20 constitutes a coupling means whereby the sprocket wheel 18 can be caused to either rotate with or remain stationary during the rotation of the main wheel 16.

Outwardly bowed standards 24 extend from the outer or lower end of the extension frame 14 and are provided, at their lower ends, with laterally extending brackets 25 adapted to be connected, as by means of suitable couplings 26, to arms A extending laterally from a harvester B, additional means, such as a brace rod C being provided for connecting the bracket 2 to the harvester B.

The harvester is provided with the usual or any preferred mechanism D for discharging bundles of harvested grain from one side of the machine and the various parts are so proportioned that, when the shock former constituting the present invention is coupled to one side of a harvester, the said discharge mechanism D is directly opposite the space formed between the standards 24.

Extending upwardly from the upper ends of the standards 24 and along lines parallel with the extension frame 14 are reinforcing strips 27 which are extended under the strip 5 and secured thereto and to the standards 4 in any suitable manner, the said strips 27 being arched laterally over the base frame 1 and merging into or secured to outer standards 28 which extend upwardly from the outer sides of the base frame 1. The arched portions 29 of the strips 27 are connected by strips 30 and any suitable number of retaining rods 31 or the like may be connected to these strips and extended downwardly between the standards 28. The connecting strip 6 hereinbefore referred to is disposed close to the upper end of the elevator 9 and in order that the fingers 11 may pass the same, portions of said strip are bent downwardly, as shown at 6' in Fig. 2. The space between the arched portions 29 and the upper end of the elevator constitutes a throat through which bundles are delivered from the elevator and into the shock former made up of the base frame 1, standards 4 and 28 and arched portions 29.

Brackets 32 are slidably mounted on the front ends of the strips 30 and are adapted to be adjusted back and forth by a lever 32' connected thereto by a rod 33'. These brackets support a front strip 33 to which are connected depending spring fingers 34 supporting retaining strips 35 which extend downwardly to points close to the base frame 1. These strips 35 serve to prevent the butt ends of the bundles delivered to the shock former from shifting forwardly undesirable distances.

The shaft 8 hereinbefore referred to is provided, at one end, with a bevel gear 36 which receives motion, through a bevel gear 37, from a short laterally extending shaft 38 journaled in a bracket 39 extending laterally from the frame of the shock former. A sprocket 40 is secured to this shaft 38 and receives motion, through a chain 41, from the drive sprocket 18 hereinbefore referred to. The other end of the shaft 8 has a flexible shaft 42 coupled thereto, this flexible shaft being extended to a coupling member 43 in which one end of a stem 44 is mounted for rotation. This stem is provided, at its other end, with a twisting coil 45 and, if desired, and as shown in the drawings, one of the intermediate convolutions of the coil may be formed with a curved prong 46 extending in the direction of rotation of the stem and coil. Stem 44 rotates within a bracket 47 which is pivotally mounted on the connecting strip 5, there being a block 48 secured to this strip and which carries the bracket 47.

An arm 49 extends fixedly from the block 48 and past the stem 44 and is connected, by a spring 49' to the bracket 47 so as thus to hold the coil 45 normally pressed downwardly.

An elongated shoe 50 is formed with or secured to the bracket 47 and extends below but at one side of the coil 45, this shoe being formed with a prong 51 extending laterally and rearwardly from the shoe.

A disk 52 rotates with stem 44 and is feathered thereon, there being a spring 53 connected to the stem and to the disk for holding said disk normally drawn toward bracket 47.

A clutch member 54 is carried by the disk and another clutch member 55 is carried by the coupling 43.

A cam 56 extends from the block 48 and into the path of the disk 52, spring 49' operating normally to hold the disk 52 elevated away from the cam 56.

A knife 57 is carried by the bracket 47 close to the stem 44 so as to cut off any material which may twist about and rotate with the stem 44.

Slidably mounted on the rails or standards 4 is a carriage 58 formed of blocks 59 engaging the standards 4 and a cross rod 60 connecting the blocks.

Secured to rod 60 and close to the rear standard 4 is a supporting finger 61 constantly in a horizontal or substantially horizontal position.

Figures 5, 6, 7, 8, 9, 10:
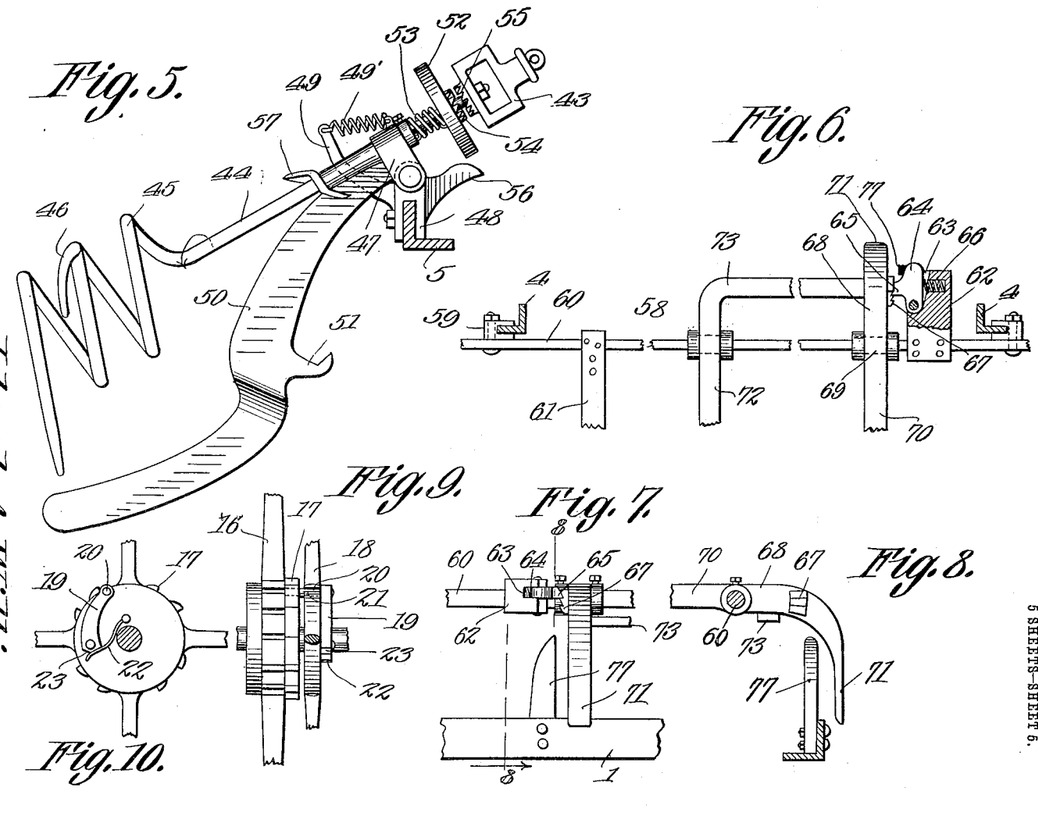
Fig. 5 is an enlarged front elevation of the shock tying mechanism.
Fig. 6 is a plan view of a portion of the shock supporting carriage, a portion thereof being shown in section and its guide rails being also shown in section.
Fig. 7 is a side elevation of a portion of the carriage shown in Fig. 6 and showing it in close proximity to its actuating cam.
Fig. 8 is a section on line 8—8 Fig. 7.
Fig. 9 is a front elevation of the hub of the main drive wheel and of the main sprocket and showing the coupling employed for coupling the wheel and sprocket.
Fig. 10 is a side elevation of the structure shown in Fig. 9.

Secured to the rod 60 near the other or front standard 4 is a bracket 62 having a slot 63 in which is pivoted a dog 64 the head 65 of which is held normally projected by a spring 66 bearing against the dog and seated in the bracket 62, as shown in Fig. 6. The head 65 of the dog normally engages one of a series of ratchet teeth 67 formed upon one face of the short arm 68 of a supporting lever 69, this lever having a long arm 70 extending transversely within the front portion of the shock former and substantially equal in length to the stationary finger 61. The short arm 68 of lever 69 is curved downwardly to form a resetting extension 71 for the purpose hereinafter set forth. This lever 69 is pivotally mounted on the rod 60. Another lever 72 is pivotally mounted on the rod 60 and is located equidistant from the finger 61 and lever 69, there being a laterally extending finger 73 upon the short arm of the lever 72 and which extends under the short arm 68 of lever 69, so that, when said lever 69 is held in a horizontal position, the lever 72 will also be held in a horizontal position. The two levers 69 and 72 together with the finger 61 coöperate to support bundles as they are delivered into the shock former. The carriage 58 including these levers and the finger 61 is held yieldingly in an elevated position by springs 74 engaging the end portions of the rod 60, said end portions being extended forwardly and rearwardly from the frame of the shock former, as shown particularly in Fig. 2. The upper ends of the springs 74 are secured to brackets 75 upstanding from or formed integral with the connecting strip 5. These springs serve to hold the carriage 58 normally in position close to the bottom of the throat formed at the upper end of the elevator 9. Extending downwardly through the spaces between the levers and finger of the carriage are spring retaining fingers 76 secured to one of the strips 30 and disposed in the path of the bundles as they are delivered into the shock former by the elevator 9.

Upstanding from the base frame 1 and in the path of the free end of the dog 64 is a stationary cam 77 for the purpose hereinafter set forth.

A setting roller 78 is carried by the strip 6 and is located in the path of the curved finger 71 of lever 69 so that, as said lever moves upwardly, it will strike against the roller and be shifted thereby as hereinafter set forth.

Figure 3:
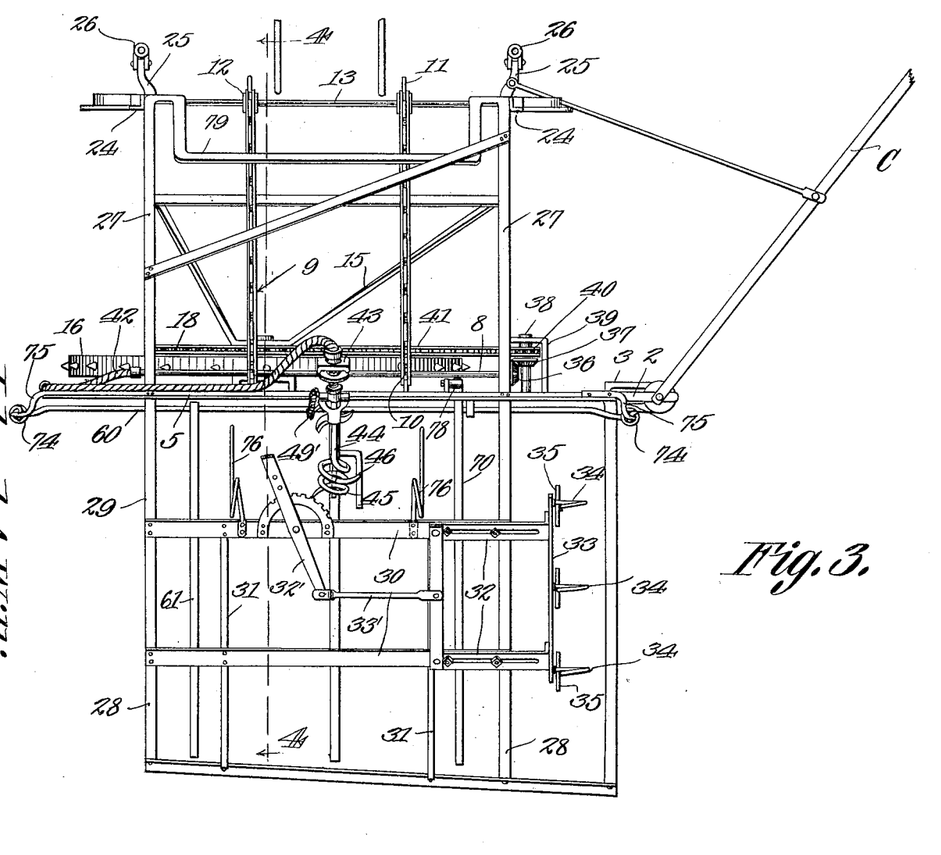
Fig. 3 is a plan view of the machine.
Figure 4:
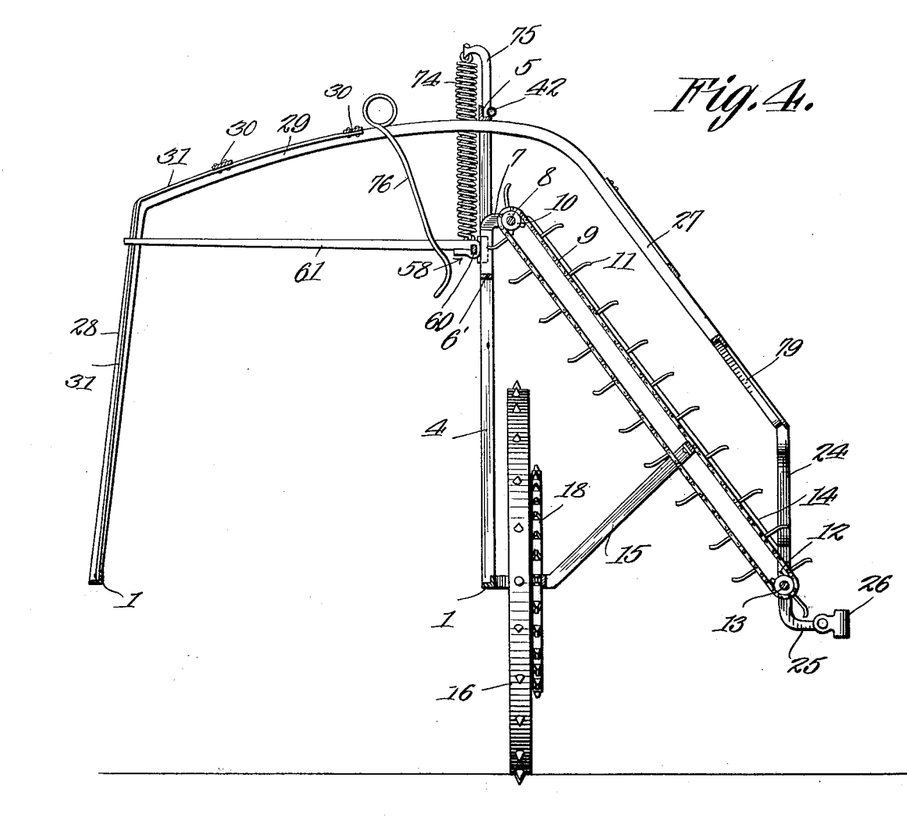
Fig. 4 is a section on line 4—4 Fig. 3.

As shown in Fig. 3, the lower or outer ends of the strips 27 are connected by an arched cross strip 79 so that, when the bundles are directed from the harvester and onto the elevator 9, they will not be interfered with by any portion of the frame of the machine.

It is to be understood that, under normal conditions, the carriage 58 is in its uppermost position. As the machine is moved forward the wheel 16, if coupled to the sprocket 18, will drive the chain 41 and cause motion to be transmitted through sprocket 40, gear 37 and gear 36 to the shaft 8, which will thus rotate continuously during the operation of the machine. Likewise the flexible shaft 42 will be continuously operated and, consequently, the coupling member 43 will rotate continuously upon the stem 44. Furthermore shaft 8 will operate the elevator 9 continuously so that, as the bundles are discharged by the mechanism D of the harvester, they will be directed onto the elevator 9 and carried upwardly to the throat in the side of the shock former where they will be successively directed against the shoe 50 of the tying mechanism. As the first bundle of the shock is delivered into the shock former it presses against the fingers 76 and, at the same time, a wisp of straw is engaged and lifted by the prong 51 so that, as the bundle is forced under the shoe 50, this wisp of straw will be brought into position for engagement by the coil 45 or the prong 46. As the bundle passes under the shoe 50, it causes said shoe to swing upwardly and, consequently, the disk 52 is brought into engagement with the cam 56 and is shifted longitudinally of the stem 44 until the clutch member 54 is brought into engagement with the continuously rotating clutch member 55. Consequently the stem 44 is rotated as soon as the bundle is brought to position under the shoe 50 and the rotating spiral 45 or the prong 46 will engage the elevated wisp of straw and twist it up into the spiral as the bundle passes from under the shoe. The next bundle delivered into the shock former will be pushed against the shoe 50 so that a wisp of straw will be lifted from the bundle and as the shoe is lifted by the bundle passing thereunder, the lifted wisp will be drawn into engagement with the rotating spiral 45 or prong 46 and will be twisted with the previously twisted wisp. As a third bundle is forced into the shock former and against the previously deposited bundles, a wisp of straw will be lifted therefrom and twisted by the spiral 45 or prong 46 with the wisps already acted on by the spiral. This operation will be carried on continuously as long as the bundles are delivered to the shock former, all of the bundles thus being tied together by a rope made up of wisps of straw gathered from the bundles and each time a bundle passes from under the shoe 50, the spring 49' will shift the shoe downwardly and lift disk 52 away from cam 56 so that the rotation of spiral 45 will cease until another bundle is brought to position under the shoe 50. As the bundles are delivered into the shock former, the spring fingers 76 are pressed laterally away from the throat and, as the bundles are gradually tied together and the shock increases in size, the weight of the shock being formed will cause the carriage 58 to move downwardly, the blocks 59 sliding along the standards or rails 4. As the levers 72 and 69 as well as the finger 61 are normally extended along horizontal lines, it will be obvious that the shock will be supported thereby upon one side with its butt end forward.

Figure 2:
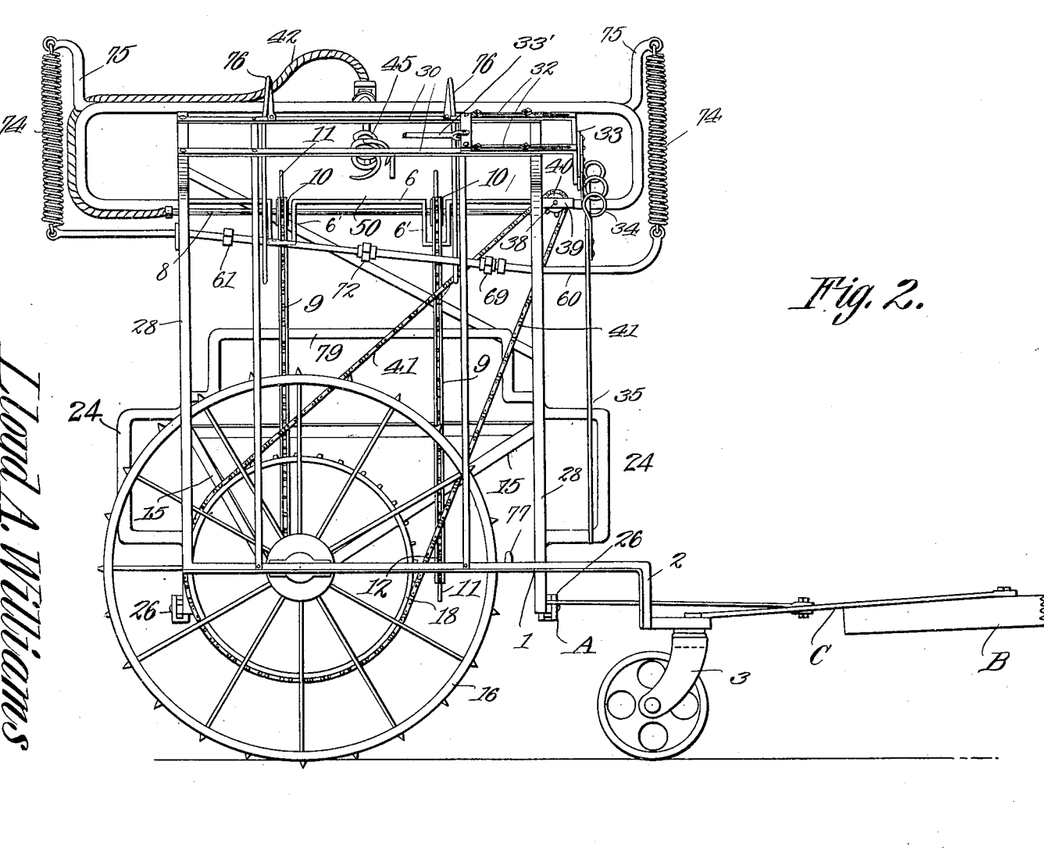
Fig. 2 is a side elevation of the shocking mechanism.

By referring particularly to Fig. 2 it will be seen that the rod 60 constituting a part of the carriage is inclined slightly downwardly and forwardly. Consequently, in the absence of some retaining means, there would be a tendency of the shock to slide forwardly out of the shock former. To prevent this the retaining strips 35 have been used. As soon as the carriage reaches a predetermined point in its downward movement, which point is attained when a shock of predetermined weight has been produced, the dog 64 is brought against the cam 77 and is shifted laterally so as to remove its head 65 from engagement with the teeth 67. Consequently, the pivoted lever 69 will promptly swing downwardly, at the same time permitting lever 72 to swing downwardly. Thus the forward and middle portions of the shock are left unsupported and the butt end of the shock will drop to the ground while the head of the shock will remain supported by the finger 61. As soon as the carriage 58 is relieved of the full weight of the shock, the springs 74, which are under stress, will slide the carriage 58 upwardly to its initial position, the upward movement of the finger 61 together with the forward movement of the entire machine, being such as to lift the inclined deposited shock to an upright position so that, after the carriage has reached its uppermost position above the head of the shock, it can move forward over the shock and leave the shock standing on end upon the ground. While the carriage 58 is descending, discharging the shock and ascending, any bundles which may be deposited in the shock former will be retained by the spring fingers 76. As the carriage ascends to its normal position, the curved finger 71 of lever 69 will strike against the roller 78 and be shifted downwardly, thus moving the lever 69 back to its horizontal position and causing the short arm 68 thereof to engage finger 73 and thus move the lever 72 back to its normal position. Obviously, therefore, the parts will be reset and the operation hereinbefore described can be repeated.

It is to be understood that the frame of the shock former can be varied as to form, size and proportions within the scope of the present invention and that any changes necessary in order to adapt the machine for use in connection with harvesters of different types can also be made.

Obviously, by uncoupling the sprocket 18 from the wheel 16, the machine may be drawn from place to place without operating the shock forming mechanism.

Figure 1:
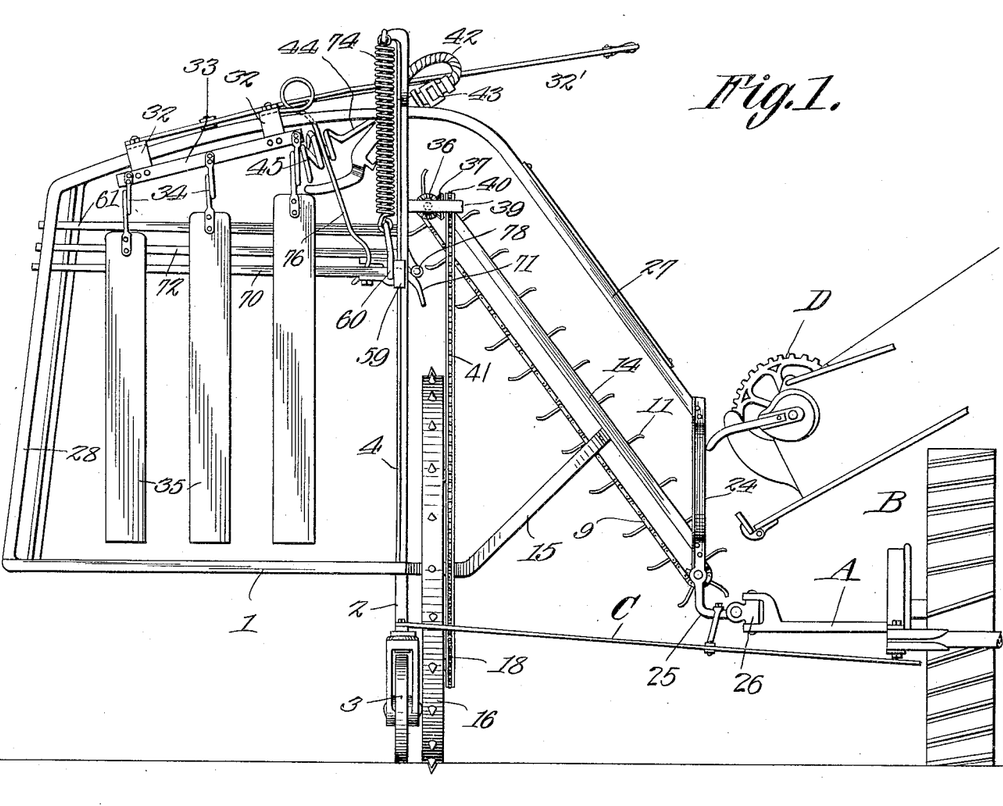
—Figure 1 is a front elevation of the shock forming machine, a portion of the harvester to which it is connected, being also shown.

By referring particularly to Figs. 1 and 3 it will be seen that the frame of the shock former tapers rearwardly so that the small or head ends of the bundles will be held snugly in the rear portion of the shock forming frame.

What is claimed is:—

1. A shock former including a straw twisting element mounted for rotation, driving mechanism therefor, means operated by a bundle moving toward said element for coupling the element to the driving mechanism, means for placing a portion of the said bundle into engagement with the revoluble twisting element, and means for uncoupling the twisting element from its driving mechanism after a bundle has passed beyond said element.

2. In a shock forming machine, the combination with a supporting structure, and means for directing bundles one at a time onto said structure, of separate means under the control of said bundles for lifting wisps of straw from the bundles and twisting together the wisps of the successive bundles.

3. In a shock forming machine, the combination with a supporting structure, of means for feeding bundles successively onto said structure, means under the control of the bundles for lifting wisps of straw from the successive bundles while being fed onto the supporting structure, and means under the control of the bundles for twisting together the wisps of the successive bundles.

4. In a shock forming machine, the combination with a supporting structure, of means for feeding bundles successively onto said structure, means under the control of the bundles for lifting wisps of straw from the successive bundles while being fed onto the supporting structure, and means under the control of the bundles for twisting together the wisps of the successive bundles, said means including a revoluble coil for engaging the wisps.

5. In a shock forming machine, the combination with a supporting structure, of means for feeding bundles successively onto said structure, means under the control of the bundles for lifting wisps of straw from the successive bundles while being fed onto the supporting structure, and means under the control of the bundles for twisting together the wisps of the successive bundles, said means including a coil and a curved prong for engaging the wisps.

6. In a shock forming machine, the combination with a supporting structure, of means for feeding bundles successively onto said structure, means under the control of the bundles for lifting wisps of straw from the successive bundles while being fed onto the supporting structure, and means under the control of the bundles for twisting together the wisps of the successive bundles, said twisting means including continuously operating drive mechanism, a stem, a wisp engaging coil revoluble with the stem, normally disengaged coupling members upon the stem and drive mechanism respectively, and means operated by the pressure of a bundle thereagainst for placing said coupling members in engagement with each other to rotate the coil.

7. In a shock forming machine, the combination with a supporting structure, of means for feeding bundles successively onto said structure, means under the control of the bundles for lifting wisps of straw from the successive bundles while being fed onto the supporting structure, and means under the control of the bundles for twisting together the wisps of the successive bundles, said twisting means including continuously operating drive mechanism, a stem, a wisp engaging coil revoluble with the stem, normally disengaged coupling members upon the stem and drive mechanism respectively, means operated by the pressure of a bundle thereagainst for placing said coupling members in engagement with each other to rotate the coil, and means for automatically disengaging the coupling members when the twisting mechanism is relieved of the pressure of a bundle thereagainst 8. A shock forming machine including a supporting structure, means for supplying bundles successively to said structure, and mechanism for tying together the bundles, said mechanism including a coupling member constituting a drive element, a coil, a coupling member revoluble with the coil, said coil and coupling member being tiltably mounted, means movable with the coil for engagement by a bundle to shift the coil and coupling member out of normal position, means coöperating with said coupling member for placing it in engagement with the drive member during the movement of the coil out of normal position, and means for lifting a wisp of straw from each bundle to direct it into engagement with the coil while rotating.

9. In shock forming mechanism, a tiltably mounted twisting coil, yielding means for holding it normally in a predetermined position, driving mechanism, means operated by the pressure of a bundle thereagainst for shifting the coil out of its normal position, means operated by such movement of the coil for coupling it to the driving mechanism, and means for directing wisps from successive bundles to direct them successively into engagement with the twisting coil.

10. In a shock forming machine, the combination with a supporting structure, of a bracket tiltably mounted, a stem mounted for rotation therein, a twisting coil revoluble with the stem, a bundle engaging shoe extending from the bracket, wisp engaging and lifting means carried by the shoe, a driving element, a coupling member carried by the stem, and means for shifting the coupling member into engagement, with the driving element when the bracket and shoe are shifted out of normal position.

11. In a shock forming machine, the combination with a supporting structure, of a bracket tiltably mounted, a stem mounted for rotation therein, a twisting coil revoluble with the stem, a bundle engaging shoe extending from the bracket, wisp engaging and lifting means carried by the shoe, a driving element, a coupling member carried by the stem, means for shifting the coupling member into engagement with the driving element when the bracket and shoe are shifting out of normal position, and means for automatically returning the bracket and shoe to their normal positions when relieved of the pressure of a bundle thereagainst.

12. A shock forming machine including a shoe adapted to be swung by the pressure of a bundle thereagainst, means on the shoe for engaging and lifting a wisp of straw from the bundle, a twisting coil movable with the shoe, driving mechanism, means for holding the shoe and the twisting coil normally in a predetermined position, and means operated by the movement of the shoe and coil under the pressure of a bundle against the shoe, for coupling the coil to the driving mechanism.

13. A shock forming machine including a shoe adapted to be swung by the pressure of a bundle thereagainst, means on the shoe for engaging and lifting a wisp of straw from the bundle, a twisting coil movable with the shoe, driving mechanism, means for holding the shoe and the twisting coil normally in a predetermined position, and means operated by the movement of the shoe and coil under the pressure of a bundle against the shoe, for coupling the coil to the driving mechanism, said means including a stationary cam, a coupling member slidable relative to but revoluble with the coil, and yielding means for holding the coupling member disengaged from the driving mechanism, said coupling member being shiftable against the cam.

14. In a shock forming machine, the combination with a yieldingly supported shock holding structure, of means for directing bundles successively onto said structure, means to direct the structure downwardly under the weight of the bundles, means for lifting wisps of straw from the bundles during their passage onto said structure, means for twisting together the wisps of the successive bundles, and means for automatically discharging the shock from the supporting structure when said structure is brought downwardly to a predetermined position.

In testimony that I claim the foregoing as my own, I have hereto affixed my signature in the presence of two witnesses.

LLOYD A. WILLIAMS.

Witnesses:
HARRY J. TAYLOR,
ELLA M. WOODFORD.

Copies of this patent may be obtained for five cents each, by addressing the "Commissioner of Patents, Washington, D. C."